United States Patent [19]

Hamilton et al.

[11] 4,130,451
[45] Dec. 19, 1978

[54] PROCESS FOR THE MANUFACTURE OF FILAMENT WOUND PIPE USING DEFORMABLE MATERIAL AT THE WIND STOPS

[75] Inventors: Alan D. Hamilton, Aurora; Gregory P. Peterson, Carol Stream; Walter R. McGuire, Aurora, all of Ill.

[73] Assignee: Standard Oil Company (Indiana), Chicago, Ill.

[21] Appl. No.: 792,320

[22] Filed: Apr. 29, 1977

[51] Int. Cl.$^2$ .......................................... B65H 81/00
[52] U.S. Cl. .................................... 156/86; 156/175; 156/425
[58] Field of Search ............... 156/173, 175, 172, 161, 156/162, 165, 84, 86, 425, 296; 285/DIG. 20, 423; 138/173, 108, DIG. 2; 220/3

[56] References Cited

U.S. PATENT DOCUMENTS

| 3,033,730 | 5/1962 | Martin | 156/165 |
| 3,629,028 | 12/1971 | McLarty et al. | 156/175 |
| 3,661,670 | 5/1972 | Pierpont, Jr. | 156/175 |
| 3,669,782 | 6/1972 | McLarty | 156/84 |
| 3,765,979 | 10/1973 | Thomas | 285/423 |
| 3,874,329 | 4/1975 | McLarty | 118/125 |
| 4,026,747 | 5/1977 | DeLorean et al. | 156/172 |

Primary Examiner—Douglas J. Drummond
Assistant Examiner—Michael W. Ball
Attorney, Agent, or Firm—Stanley M. Welsh; Arthur G. Gilkes; William T. McClain

[57] ABSTRACT

In the process of manufacturing a pipe by winding either resin-free or resin-impregnated filaments or roving onto a mandrel in layers wherein there are both a resin curing step and changes both in direction and angle of winding of said filaments between layers at fixed locations described hereinafter as wind-stops, the improvement comprising providing a means such as a deformable or movable insert that 1) is capable of substantially withstanding the compressive forces arising from the winding of said filaments or roving upon the mandrel and remaining substantially uneffected by any temperature arising during manufacture of said pipe, 2) is substantially inert to said resin composition, 3) yields to the compressive forces which can arise due to shrinkage of said pipe during said resin curing step, and 4) is adapted to permit said shrinkage so as to avoid the creation of strains in the longitudinal direction of said pipe.

5 Claims, 7 Drawing Figures

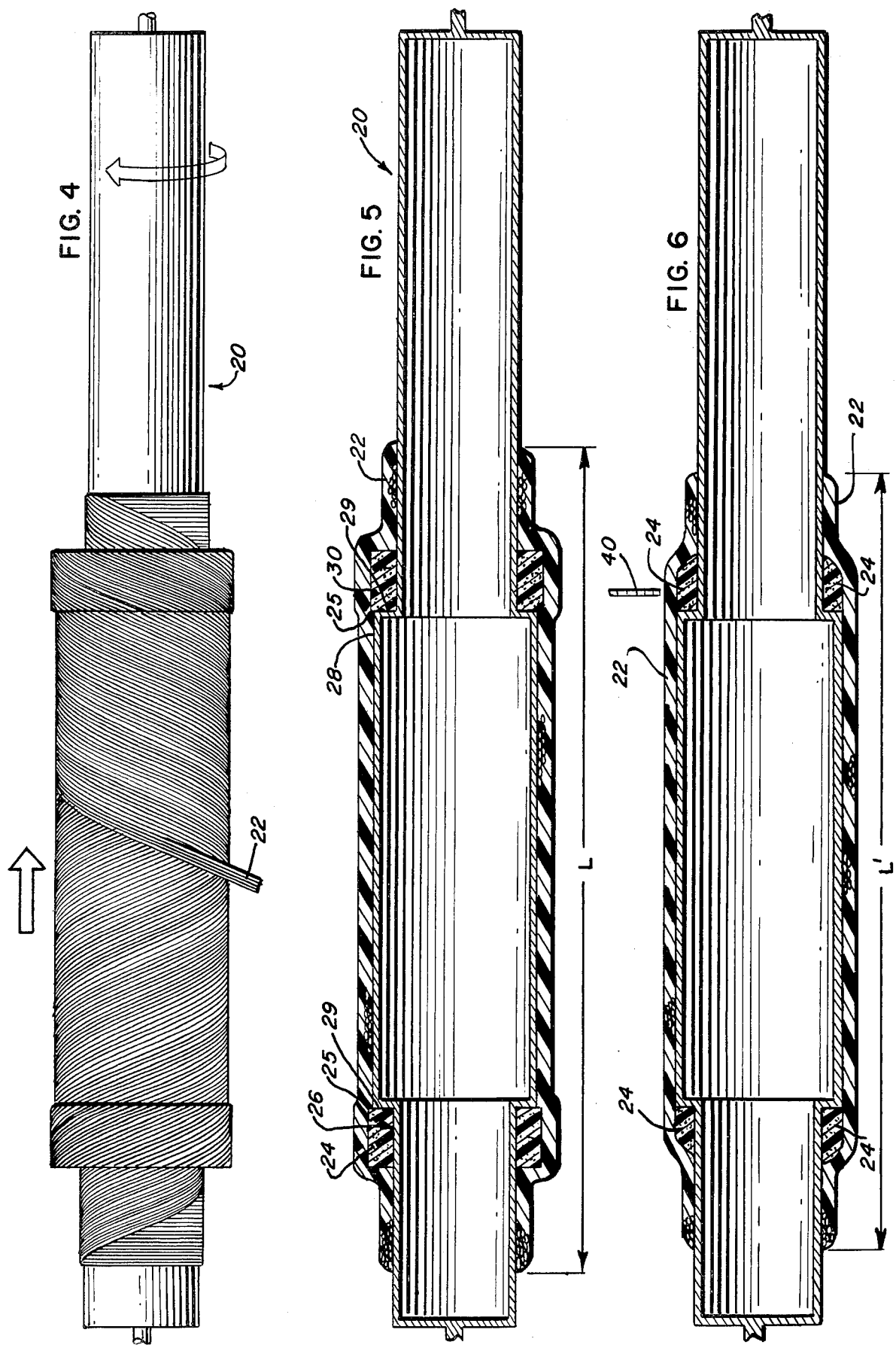

PROCESS FOR THE MANUFACTURE OF FILAMENT WOUND PIPE USING DEFORMABLE MATERIAL AT THE WIND STOPS

BACKGROUND OF THE INVENTION

1. Field of the Invention

This invention relates to resin-impregnated filament wound pipe produced on a mandrel.

2. Background

Filament wound pipe able to withstand high pressures of a constant or intermittent nature are currently made by winding either resin-free or resin-impregnated filaments, such as glass, oriented asbestos, oriented organic fibers, graphite or carbon fibers, etc., at a uniform pitch or angle around a mandrel. It is known that it is important to maintain a uniformity in pitch for each layer of windings because the distribution of stresses critically hinges thereon.

In order to ensure uniformity of pitch for windings within each layer, a wind-stop is often employed. A "wind-stop" is herein defined to mean that location at which the angle of windings changes during the process of winding filaments or roving onto a mandrel. The angle of winding usually changes between layers where one layer is wound relative to the mandrel in a first direction and the next layer is wound relative to the mandrel in the opposite direction. Some examples of wind-stops are: a place where the diameter of a mandrel changes giving rise to a groove or a step, a row of peg-like projections which can be removed, expandable and retractable projections, and the like.

Examples of machinery and methods commonly used to manufacture filament wound pipe can be found in McLarty, U.S. Pat. No. 3,874,329 (1975) and McLarty et al., U.S. Pat. No. 3,629,028 (1971), both incorporated herein by reference.

Some of the resins used in filament wound pipe are thermosetting polyesters, phenolic resins, silicones, polyamides, melamine-formaldehydes, bisphenol A-epichlorohydrin and other epoxy resins and the like.

In the case of many thermosetting resins, there is a decrease in volume upon curing. This decrease in volume in the axial direction of a filament wound pipe can be as high as 5 percent. Any decrease in volume during cure will generally introduce stresses in the longitudinal or axial direction of a pipe which uses wind-stops to aid changes in the angle of wound filaments.

BRIEF DESCRIPTION OF THE INVENTION

It is an object of this invention to improve the performance of resin-impregnated filament wound pipe by providing a means for relieving stresses in the longitudinal direction which would otherwise occur during manufacture due to shrinkage on cure of said resin.

It is an object of this invention to provide a collapsible insert which will permit the relieving of stresses during the manufacturing process of a filament wound pipe, wherein said deformable insert also makes easier the removal of said filament wound pipe from said mandrel and aids in avoiding damage to said mandrel during said removal.

Other objects of this invention will become clear to one of average skill in the art based upon this disclosure.

It has been discovered that the introduction of stresses within the longitudinal direction of a resin-impregnated filament wound pipe employing wind-stops which prevent the overall length of said pipe from decreasing during cure of said resin can have a substantial and deleterious effect upon the physical performance of such pipes as exemplified, for example, in ASTM D-1598-67 (reapproved 1972). In general, the greater the resin shrinkage during cure, the more substantial and deleterious the effect upon the overall physical performance of such a pipe.

In general, any means for permitting the overall axial length of a filament wound pipe to decrease during resin cure is contemplated by this invention. It is believed preferable that this change in overall length be gradual and against a substantially uniform but yielding resistance.

A particularly advantageous way to permit overall length of a filament wound pipe to change during resin cure is to insert in one or more wind-stops of a mandrel any deformable material which has a compressive strength in the range of about 25–300 pounds per square inch, which does not chemically or physically react with the particular resin system used in the pipe, and which is substantially uneffected by the temperatures arising during resin cure. An example of such a material is a urethane foam. Urethane foams, as most foams in general, provide a substantially uniform but yielding resistance believed particularly desirable in this invention.

DETAILED DESCRIPTION OF THE INVENTION

FIG. 1 discloses a mandrel on which resin-impregnated filaments or roving is being wound. A cut away area discloses a step-down in which there is a deformable material shown in cross-section.

FIGS. 2, 3 and 4 disclosed the use of a wind-stop in winding one layer from left to right at an angle of, for example, 54¾° and the next layer from right to left at an angle of, for example, −54¾°.

FIG. 5 is a side elevation view in cross-section of a resin-impregnated filament wound pipe after winding and before oven curing, wherein the resin-impregnated filaments are shown in a schematic layer.

FIG. 6 is the same side elevation view in cross-section as FIG. 5 but after oven curing.

Figure 1:
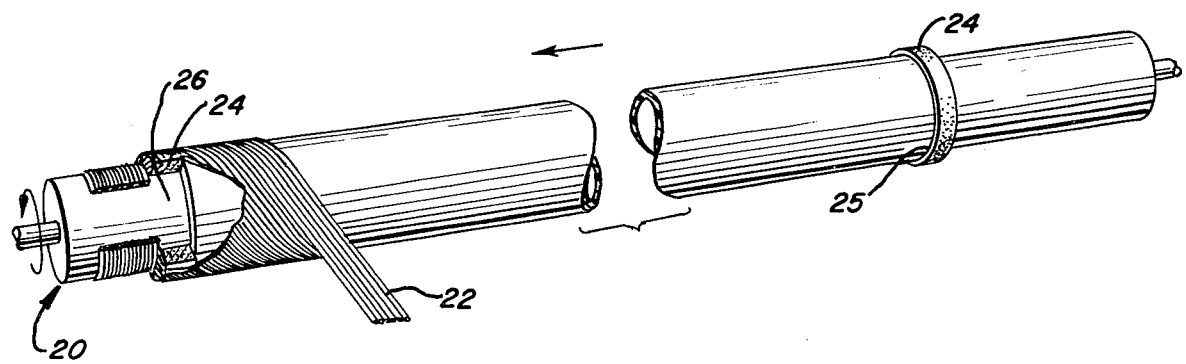

In FIG. 1, there is a mandrel 20, filament roving 22 and deformable material 24. As mandrel 20 rotates about its axis and moves in the directions shown, filaments 22 are being wound at an angle of 54¾° to the axis of said mandrel. It is to be noted that a variety of angles may be employed other than 54¾°, but that this particular angle is sometimes preferred because it provides axial reinforcement to radial reinforcement of 1 to 2. It is known that in a pipe under pressure there is twice as much radial pressure as axial pressure.

Deformable materials 24 are located at each step-down 26. There is a ridge 25 which indicates that the deformable material 24 in the uncrushed state is wider than step-down 26. It is expected that after curing wherein the resin decreases in volume, that the final width of the deformable material will be substantially the same height as step-down 26. This is shown in FIG. 6.

Figure 2:
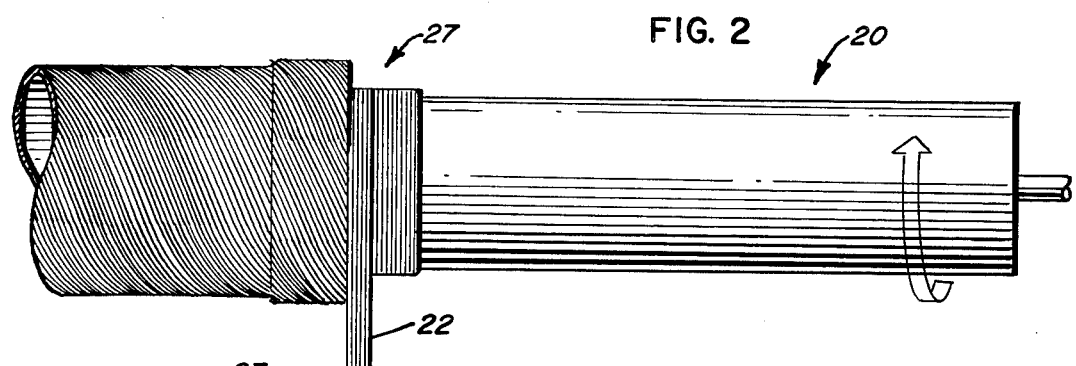
Figure 3:
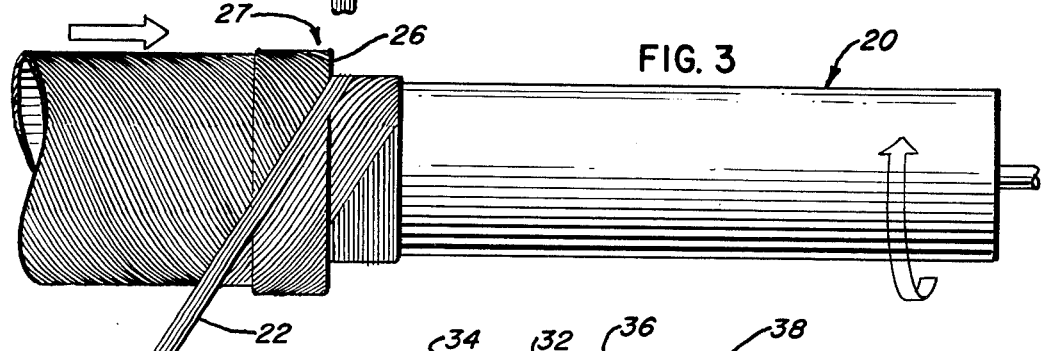

In FIGS. 2, 3 and 4, filament roving 22 is changing direction respectively from 54¾° to 90° to −54¾° with respect to the axis of mandrel 20 at a wind-stop defining a turnaround area 27. Turnaround area 27 is immediately after deformable insert 24 which is located in step-down 26. It is clear from FIGS. 3 and 4 that as mandrel 20 moves in the direction indicated by arrows the roving 22 is wound from right to left.

In FIG. 5, deformable material 24 in step-down 26 is flush against vertical wall 29 so as to avoid either filaments or resin entering between vertical wall 29 and deformable insert 24. Ridge 25 indicates that deformable material projects a sufficient distance above surface 28 of mandrel 20 at its largest outside diameter so that after curing the final dimension of deformable material 24 has substantially the same height as step-down 26. This is shown in FIG. 6.

In FIG. 6, oven cured filament wound pipe is disclosed. A cutting means 40 such as a saw is at the location of the initial cut made to permit removal of the cured pipe from the mandrel. It is clear that the cutting means is intended to cut through resin filled filament roving 22 and into deformable material 24 without marring the mandrel. Subsequent to removal of the filament would pipe from mandrel 20, there is generally an additional trimming step to remove all traces of the deformable material 24.

In FIG. 5, the overall axial length, L, is about $\frac{3}{8}$ to $\frac{1}{2}$ inch longer than L'. There is approximately a 5% decrease in overall length, L, after curing observed when the polyester of Example 1 is used. It is clear that the greater the percent shrinkage which occurs and is accommodated by the deformable material, the less stresses that are introduced in the longitudinal direction of the pipe.

If deformable material 24 or some other means of relieving stresses that occur as a result of resin shrinkage during oven curing is not used, then during removal of the pipe from the mandrel at the first instant that the pipe is freed from restraining wind-stops it suddenly changes its overall longitudinal dimension from L to about L'.

It is believed that the overall higher performance of pipes made by means of this invention is connected with the gradual relieving of stress permitted by the deformable material 24. In the example of this invention, deformable material 24 is made from a urethane foam. Other deformable materials are expected to work equally well provided that they uniformly yield to the stresses imposed thereon during resin cure. It is clear that the deformable material must have sufficient strength so as not to deform significantly during winding of filaments 22 but does deform under the forces which arises during oven curing. The range of compressive strengths of the deformable material depends upon the forces that arise during winding and curing.

Figure 7:
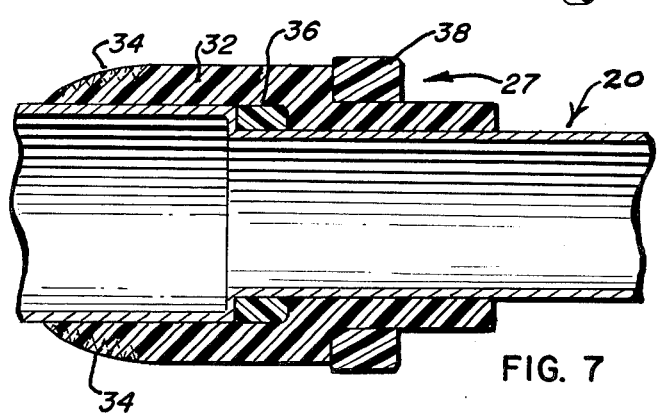
FIG. 7 is a side elevation view in cross-section of a mandrel to which is attached an axially movable bell-form with phantom threads shown as an optional feature.

In FIG. 7, there is an axially movable bell-form 32, two deformable inserts 36 and 38, mandrel 20 and in phantom outline optional threads 34. It is to be noted that deformable material 38 acts as a means for relieving stresses that would otherwise arise between threads 34 and the turnaround area 27. Deformable material 36 acts as a means for relieving stresses that would otherwise arise along the length of filament wound pipe beginning at the threads 34 and moving to the left. It is of course desirable to have deformable material 38 regardless of whether optional threads 34 are being used because in the process of removing the cured pipe it is desirable to have deformable material 38 present in order to avoid marring bell-form 32 in the initial cut to free the cured pipe from wind-stops.

It is to be noted that examples of variations by combining FIGS. 1–7 are a bell-form 32 at one end with a simple step-down 26 at the other or a bell-form 32 at each end. These variations are intended to be part of this invention.

EXAMPLE 1

On a machine similar to that disclosed in U.S. Pat. No. 3,629,028, Owens Corning Fiberglass type 30 roving, designated 475 BA 450 is passed through a resin bath of the type disclosed in U.S. Pat. No. 3,874,329 (FIG. 2) containing a resin of three to five poise in viscosity sold by Ashland Chemical under the designation 7240MC, and applied to a mandrel of 2.25 inches in diameter such as disclosed in FIG. 1 having step-down wind stops. The roving is applied at a rate of 100 linear feet per minute in three layers under a tension of about two pounds per roving wherein 30 two ply strands of roving are applied at one time at an angle of about $+54\frac{3}{4}°$ and $-54\frac{3}{4}°$, respectively in alternate winding layers. After the roving has been applied, the pipe is cured in an oven for about 1 hour at 250° F., then allowed to cool for 15 to 30 minutes and removed from the mandrel and cut to final size of 10 feet.

The finished pipe consists of 30 percent by weight, as based on the total weight of pipe, of resin and about 70 percent by weight, as based on the total weight of pipe, of glass. There are three winding layers which are each double ply. The total wall thickness is about 60 mils. The pipe weighs about 0.4 pounds per linear foot, has an inside diameter of about $2\frac{1}{4}$ inches and is 10 feet in length.

Pipes were made in substantially the same way as described above except one employed a collapsible or deformable structure of a polyurethane foam ring located at each wind-stop, and the other did not.

The polyurethane foam ring was approximately 2 inches thick, had an outside diameter of about $2\frac{1}{2}$ inches and an inside diameter of $1\frac{3}{4}$ inches.

The polyurethane foam is made in a doughnut shaped mold wherein a pressure of 20 pounds per square inch is applied to restrain the amount of rise and ensure a foam density of between about 1 to 6 pounds per cubic foot. At below 1, the urethane does not have sufficient resilience to avoid collapsing during filament winding and much above 6, there is insufficient collapsing during cure to avoid introducing significant strains into the finished pipe. The particular polyurethane foam used was Polylite urethane foam sold by Reichold Company. The foam is prepared by reacting equal amounts by weight of 34-271-B and 34-843-A. The compressive strength of the urethane foam ring was found to be in the range 109 to 145 pounds per square inch. All such foams with these values were found to work successfully.

EXAMPLE 2

Pipes made with the two different methods described in EXAMPLE 1 were tested in an H-3 cyclic tester sold by McClean-Anderson, Wisc., in conformity with ASTM D-2143-69 for strength under a 1050 cycle pressure at about 75° F. TABLE 1 shows the significant improvement in strength achieved by permitting the pipe to relieve strain during cure of resin by means of a collapsible or deformable insert of urethane made as disclosed in EXAMPLE 1.

| Pipe | CYCLES | |
| --- | --- | --- |
| | With Foam | Without Foam |
| 1 | 517 | 439 |
| 2 | 567 | 373 |
| 3 | 556 | 440 |

The specific example disclosed is intended to illustrate this invention. Variations on this example are readily apparent to one skilled in the art based on the Specification and are intended to be within the scope of the invention.

The invention which is claimed is:

1. In a process for making filament wound pipe wherein filamentary roving is wound on a mandrel, a resin composition is used which decreases in volume during a cure and wherein at least one wind-stop is employed which prevents the pipe from relieving longitudinal stresses that arise during said cure, the improvement comprising fitting a deformable material to said wind-stop which is (1) capable of substantially withstanding the compressive forces arising during winding of said roving onto said mandrel and remaining substantially unaffected by any temperature occurring during manufacture of said pipe, (2) substantially inert to said resin composition and (3) adapted to yield to the compressive forces which arise during cure so as to relieve stresses and avoid creation of significant longitudinal strains.

2. The process of claim 1, wherein said material has a compressive strength in the range of 25–300 pounds per square inch.

3. The process of claim 2, wherein said material is a urethane foam having a density in the range of about 1 pound per cubic foot to about 6 pounds per cubic foot.

4. The process of claim 1, wherein said mandrel has at least one bell-form at one end.

5. The process of claim 4, wherein said bell-form is provided with threads.

* * * * *

UNITED STATES PATENT OFFICE
CERTIFICATE OF CORRECTION

Patent No. 4,130,451        Dated December 19, 1978

Inventor(s) Alan D. Hamilton; Gregory P. Peterson and Walter R. McGuire

It is certified that error appears in the above-identified patent and that said Letters Patent are hereby corrected as shown below:

| Patent Col. | Line | | | | | |
|---|---|---|---|---|---|---|
| Abstract | 11 | reads | "uneffected" | should | read | --unaffected-Abs. |
| 2 | 21 | " | " | " | " | " |
| 3 | 22 * | " | "would" | " | " | --wound-- |

Signed and Sealed this

*Twelfth* Day of *June 1979*

[SEAL]

Attest:

RUTH C. MASON
*Attesting Officer*

DONALD W. BANNER
*Commissioner of Patents and Trademarks*